J. MATTHEWS.
Box for Bottles.
No. 9,090. Reissued Feb. 17, 1880.
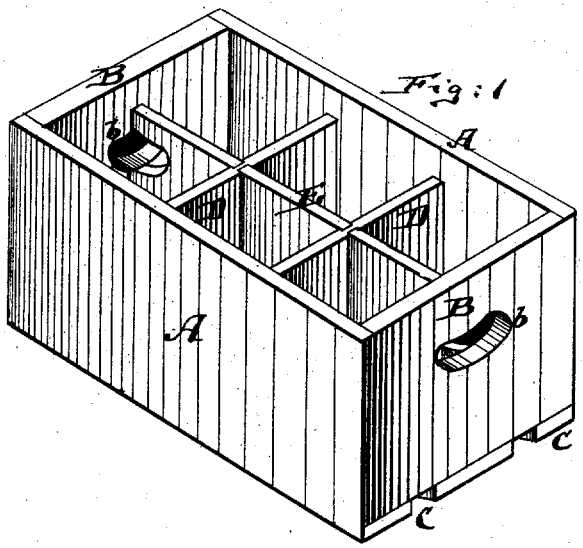
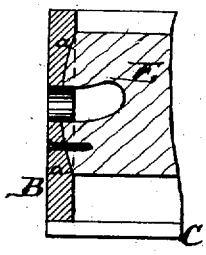
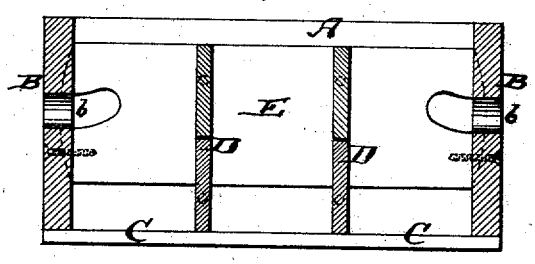
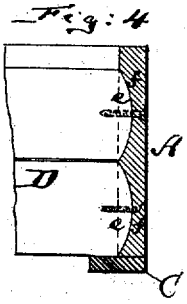
Witnesses
Willy G. A. Schultz.
John C. Tunbridge
Inventor:
John Matthews
by his attorney
A. v. Briesen
N. PETERS, PHOTO-LITHOGRAPHER, WASHINGTON, D. C.

UNITED STATES PATENT OFFICE.

JOHN MATTHEWS, OF NEW YORK, N. Y.

BOX FOR BOTTLES.

SPECIFICATION forming part of Reissued Letters Patent No. 9,090, dated February 17, 1880.

Original No. 178,175, dated May 30, 1876. Application for Reissue filed November 18, 1879.

*To all whom it may concern:*

Be it known that I, JOHN MATTHEWS, of the city, county, and State of New York, have invented a new and useful Improvement in Boxes for Holding and Transporting Bottles, of which the following is a specification.

Figure 1 is a perspective view of a box for holding and transporting bottles made according to my invention. Fig. 2 is a vertical longitudinal section of the same. Fig. 3 is a detailed vertical section through one end of the box; Fig. 4, a detailed vertical section through one side of the box.

This invention relates to improvements in the parts of which a box otherwise in general form and arrangement like the boxes now in use for holding and transporting bottles is composed, so that they may be more readily formed by machinery, and so also that when put together the box will be stronger than when united in the ordinary way.

The new features refer to the manner in which the partitions are secured in the box. The sides and ends of the box are mortised to receive the ends of the partition or partitions, the wood above and below every such mortise being of the original thickness to form retaining-shoulders above and below the partitions. The invention also refers to the manner of forming the hand-holes in the box.

In the accompanying drawings, the letters A A represent the two sides, and B B the two ends of the box. *b* are the hand-holes. C C are the bottom slats; D D, the cross or transverse partitions, and E the longitudinal partition, of which but one is shown; but a larger number may be used.

The cross-partitions are shown running down to the bottom slats, while the longitudinal partitions do not.

I have shown a box with six compartments; but the same may be varied to form any desired number of compartments as circumstances may require.

The curved ends of the longitudinal partition or partitions are inserted into and completely fill corresponding mortises *a*, that are formed in the inner faces of the ends of the box. These mortises *a* are not longer than the partition E is high, so that both below and above said partition the original thickness of the board of which the end of the box is made will form a shoulder, preventing the vertical displacement of the said partition.

The cross-partitions D have their curved ends *e* made to enter and fill corresponding mortises *f*, formed in the sides of the box, as clearly shown in Fig. 4. The longitudinal partition E is recessed wherever it is traversed by a transverse partition, so that the transverse partitions may enter said recesses to a certain extent, and thus be interlocked, the transverse partitions being likewise recessed to receive the longitudinal partitions. Screws may be used for firmly holding the parts of the box together.

For making a box of any given size and number of openings or compartments all the pieces are first made of proper form, and may be packed together indiscriminately and shipped.

The box, when put together, can be readily taken apart by taking out the screws and again put together whenever desired.

Wherever a partition, E, is opposite a hand-hole, *b*, it is partly cut away opposite such hand-hole or handle of the box, whereby the partitions may be made to extend higher up in the box than if arranged, as heretofore, entirely below the hand-holes.

The ends of the partitions D are curved, and the mortises for receiving them are also curved, as shown. This arrangement permits the use of revolving cutters for making the mortises.

I claim—

1. A box containing a series of compartments, and made with curved mortises and with curved ends to the partitions to fit the mortises, substantially as set forth.

2. In a box containing partition or partitions E, the combination of the ends B B, having hand-holes *b*, with the partitions E, having notches in line with said hand-holes, the ends of the partitions extending above and below said notches, substantially as herein shown and described.

JOHN MATTHEWS.

Witnesses:

JOHN D. WILSON,

H. P. RAFTERY.